(12) United States Patent  
Slattery

(10) Patent No.: US 10,037,269 B2  
(45) Date of Patent: Jul. 31, 2018

(54) MANAGING MEMORY IN A COMPUTER SYSTEM

(71) Applicant: International Business Machines Corporation, Armonk, NY (US)

(72) Inventor: Edward J. Slattery, Chanders Ford (GB)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 15/211,311

(22) Filed: Jul. 15, 2016

(65) Prior Publication Data

US 2016/0328318 A1    Nov. 10, 2016

Related U.S. Application Data

(63) Continuation of application No. 13/870,028, filed on Apr. 25, 2013, now Pat. No. 9,575,879.

(30) Foreign Application Priority Data

May 15, 2012    (GB) .................................. 1208434.9

(51) Int. Cl.
  *G06F 12/00*    (2006.01)
  *G06F 13/00*    (2006.01)
  (Continued)

(52) U.S. Cl.
  CPC ............ *G06F 12/00* (2013.01); *G06F 12/023* (2013.01); *G06F 12/0253* (2013.01);
  (Continued)

(58) Field of Classification Search
  CPC ........... G06F 17/30958; G06F 17/3094; G06F 17/30946
  (Continued)

(56) References Cited

U.S. PATENT DOCUMENTS 6,317,869 B1    11/2001    Adl-Tabatabai et al.
6,728,738 B2    4/2004    Wolczko et al.
(Continued)

FOREIGN PATENT DOCUMENTS

CN    101751335 A    6/2010
CN    102411513 A    4/2012
(Continued)

OTHER PUBLICATIONS

Barabash et al., "Tracing Gargage Collection on Highly Parallel Platforms," ISMM 10, Jun. 2010, 10 pages.
(Continued)

*Primary Examiner* — Edward Dudek, Jr.
*Assistant Examiner* — Sidney Li
(74) *Attorney, Agent, or Firm* — Robert J. Shatto

(57) ABSTRACT

Methods, computer program products, and systems for managing memory in a computer system in which memory locations in use at any given time are represented as a set of memory objects in a first object graph. The first object graph includes a system root object associated by references to each of the memory objects. A method includes creating a second root object for the memory so as to form a second object graph for the memory. The method also includes, in response to the dereferencing of a first object from the first object graph, associating the dereferenced first object with the second object graph so that the second object graph includes at least one dereferenced object.

20 Claims, 5 Drawing Sheets

(51) Int. Cl.
*G06F 13/28* (2006.01)
*G06F 12/02* (2006.01)
*G06F 17/30* (2006.01)

(52) U.S. Cl.
CPC .... *G06F 12/0269* (2013.01); *G06F 17/30958* (2013.01); *G06F 17/30946* (2013.01); *G06F 2212/1044* (2013.01)

(58) Field of Classification Search
USPC ......................................................... 711/156
See application file for complete search history.

(56) References Cited

U.S. PATENT DOCUMENTS

| | | | |
|---|---|---|---|
| 7,912,877 | B2 | 3/2011 | Shankar et al. |
| 2002/0120823 | A1 | 8/2002 | Kolodner et al. |
| 2002/0169556 | A1 | 11/2002 | Sokolov et al. |
| 2005/0198088 | A1 | 9/2005 | Subramoney et al. |
| 2006/0173939 | A1* | 8/2006 | Yin .................... G06F 12/0253 |
| 2009/0013017 | A1 | 1/2009 | Branda et al. |
| 2010/0223429 | A1 | 9/2010 | Cher et al. |
| 2011/0161614 | A1 | 6/2011 | Krauss |
| 2011/0225214 | A1 | 9/2011 | Guo |
| 2011/0276984 | A1 | 11/2011 | Wagner |
| 2012/0066270 | A1 | 3/2012 | Kravets |
| 2013/0311730 | A1 | 11/2013 | Slattery |

FOREIGN PATENT DOCUMENTS

| | | |
|---|---|---|
| JP | 2003050740 A | 2/2003 |
| JP | 2005108235 A | 4/2005 |
| JP | 2011505042 A | 2/2011 |
| JP | 2012234567 A | 11/2012 |
| JP | 2014197413 A | 10/2014 |
| WO | 9310504 | 5/1993 |
| WO | 0060470 | 10/2000 |

OTHER PUBLICATIONS

Joao et al., "Flexible Reference-Counting-Based Hardware Acceleration for Garbage Collection," ISCA 09, Jun. 2009, 11 pages.
Zeng et al., "Performance tuning of Java garbage collection mechanism", Computer Engineering and Design, vol. 27, No. 17, Sep. 2006; 4 pages. English Abstract Included.
Zhengchao et al. "Research of Memory Management of Java Virtual Machine", Journal of South-Central University of Nationalities, vol. 26, No. 3, Sep. 2007, 5 pages. English Abstract Included.
Decision to Grant a Patent, Application No. 2013-084588, dated Feb. 2, 2016, 3 pgs.
Search Report, Application No. GB1208434.9, dated Aug. 17, 2012, 3 pgs.
Slattery, E., "Managing Memory in a Computer System," U.S. Appl. No. 15/211,275, filed Jul. 15, 2016.

\* cited by examiner

| Object Name | Dead Object Data | |
|---|---|---|
| | Original Parent | Referencing Field |
| Object 2 | Object 1 | Field 1 |
| | | |
| | | |
| | | |

Figure 3

MANAGING MEMORY IN A COMPUTER SYSTEM

PRIORITY

This application is a continuation of application Ser. No. 13/870,028, filed 25 Apr. 2013, which claims priority to Great Britain Patent Application No. 1208434.9, filed 15 May 2012, and all the benefits accruing therefrom under 35 U.S.C. § 119. The contents U.S. application Ser. No. 13/870,028 and Great Britain Patent Application No. 1208434.9 are herein incorporated by reference in their entireties.

BACKGROUND

The present invention relates to a computer system, and more particularly, to managing memory in a computer system.

Computer systems commonly use a virtual memory management system. Virtual memory management systems use dynamic memory allocation processes and garbage collection processes to respectively allocate and reclaim memory allocations. The garbage collection process is arranged to identify allocated but unusable memory allocations, clear the associated memory objects they store and return the identified memory allocations for reuse by reallocation.

The garbage collection process requires significant processing power and may delay other processing by the computer. The memory efficiency of application programs can be improved so that fewer discarded memory objects are produced for the garbage collection process to clear. However, with multiple system or application programs running on a given computer, identifying the source of discarded memory objects is difficult and time consuming.

SUMMARY

Embodiments include methods, computer program products, and systems for managing memory in a computer system in which memory locations in use at any given time are represented as a set of memory objects in a first object graph. The first object graph includes a system root object associated by references to each of the memory objects. A method includes creating a second root object for the memory so as to form a second object graph for the memory. The method also includes, in response to the dereferencing of a first object from the first object graph, associating the dereferenced first object with the second object graph so that the second object graph includes at least one dereferenced object.

BRIEF DESCRIPTION OF THE SEVERAL VIEWS OF THE DRAWINGS

Embodiments of the present invention will now be described, by way of example only, with reference to the following drawings in which:

FIG. 3 is a table illustrating data extracted from one of the object graphs of FIG. 2b in accordance with an embodiment;

DETAILED DESCRIPTION OF THE EMBODIMENTS

Figure 1:
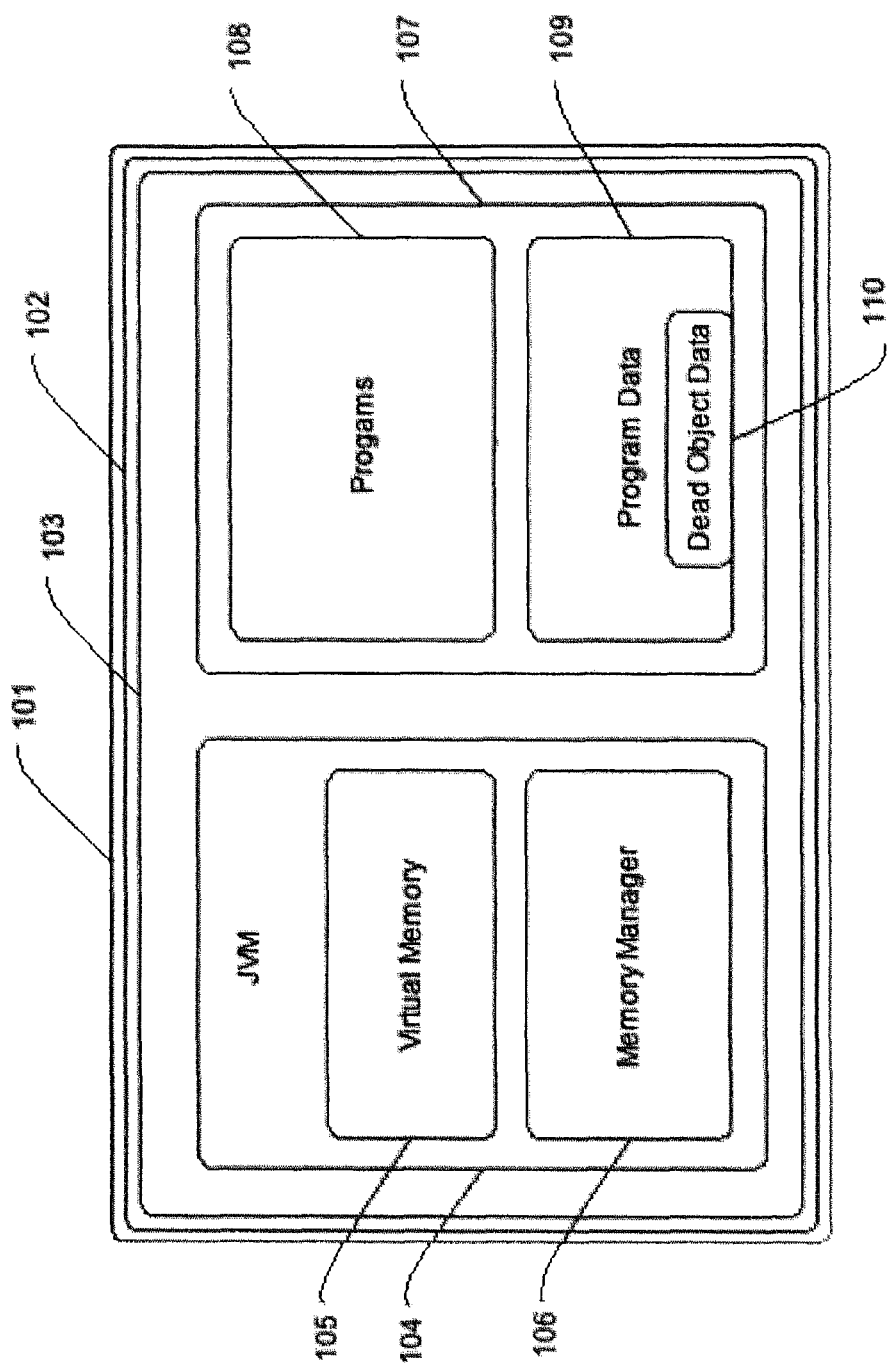
FIG. 1 is a schematic illustration of a computer system comprising a virtual machine in accordance with an embodiment.

Embodiments of the present invention are directed to managing memory in a computer system in which memory locations in use at any given time are represented as a set of memory objects in a first object graph. The first object graph includes a system root object associated by references to each of the memory objects. Methods include creating a second root object for the memory so as to form a second object graph for the memory. In response to the dereferencing of a first object from the first object graph, the dereferenced first object is associated with the second object graph so that the second object graph includes one or more dereferenced objects.

Methods may also include identifying a second object in the first object graph that referenced the first object immediately prior to the dereferencing of the first object and creating a reference from the second object graph to the second object so as to associate the first object in the second object graph with the second object in the first object graph. Methods may also include creating a first metadata object in the second object graph the first metadata object being arranged to provide the reference from the second object graph to the second object in the first object graph and to reference the first object in the second object graph. Methods may further include identifying predetermined metadata for the first object identifying the location of the first object in the first object graph immediately prior to the dereferencing; and storing the metadata in the second object graph in association with the first object.

The metadata may be stored in a second metadata object associated with the first object in the second object graph. The metadata may include data identifying a field in the second object used to reference the first object immediately prior to the dereferencing of the first object from the second object.

Methods may also include, in response to a first stage of garbage collection in which a first set of objects including all objects present in the first object graph being identified, identifying a second set of objects that include objects present in the second object graph and not present in the first object graph. Predetermined data associated with each of the objects in the second set of objects is saved prior to any further stage of garbage collection in which the second set of objects is deleted from the memory. The predetermined data may include data identifying the first object. The predetermined data may include data identifying the second object that referenced the first object immediately prior to the dereferencing of the first object. The predetermined data may include data identifying the field in the second object that referenced the first object in the first object graph immediately prior to the dereferencing.

Other embodiments provide an apparatus for managing memory in a computer system in which memory locations in use at any given time are represented as a set of memory objects in a first object graph that includes a system root object associated by references to each of the memory objects. The apparatus may be operable to create a second root object for the memory so as to form a second object graph for the memory, and in response to the dereferencing of a first object from the first object graph, associate the dereferenced first object with the second object graph so that the second object graph includes one or more dereferenced objects.

Further embodiments provide a computer program product for managing memory in a computer system in which memory locations in use at any given time are represented as a set of memory objects in a first object graph that includes a system root object associated by references to each of the memory objects. The computer program product may include a computer-readable storage medium having computer-readable program code embodied therewith, the computer-readable program code configured to: create a second root object for the memory so as to form a second object graph for the memory; and in response to the dereferencing of a first object from the first object graph, associate the dereferenced first object with the second object graph so that the second object graph includes one or more dereferenced objects.

Embodiments of the invention are arranged to preserve data relating to memory objects removed from the system object graph for use in identifying the source of such removed objects.

With reference to FIG. 1, a computer 101 is loaded with an operating system 102, which provides a processing platform for one or more application programs. In the present embodiment, the computer is loaded with a virtual machine environment application program 103, in the form of a Java runtime environment (JRE) application program, arranged to enable a user to run one or more Java virtual machines (JVMs) 104 on the computer 101. Each JVM 104 includes virtual memory 105 and a memory manager program 106 that includes a garbage collection module 107. Each JVM 104 further includes storage 107 arranged to store one or more programs 108 for running on the JVM 104 and to store input or output program data 109.

The memory manager 106 is arranged to manage the use of the memory 105 during the processing by the JVM 104 of one of the programs 108 by allocating or de-allocating portions of the memory 105 to the program 108 as required. The memory manager 106 periodically performs a garbage collection process to scan the memory 105 to identify portions of the memory 105 that have been de-allocated by a program 108, clear data from any such portions of memory and mark the portions of memory as available for further allocation by the memory manager 106 to a program 108.

Figure 2A:
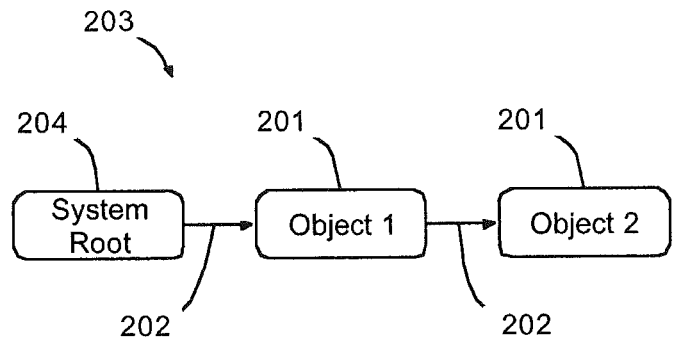
FIGS. 2a and 2b are schematic representations of object graphs in the memory of the virtual machine of FIG. 1 in accordance with an embodiment.

In the memory model for the JVM 104 the memory 105 is initially free and allocated to a memory management data construct call the heap from which locations in the memory 105 are allocated on request from a program 108 for storage of a memory object in the form of a variable, function or data structure. With reference to the embodiment shown in FIG. 2a, the memory objects 201 in use at any given time by a program 108 may be associated by means of references 202 from one object 201 to another so as to form a first object graph 203 in the form of a system object graph. The system object graph 203 shown in FIG. 2a includes a root object 204 referred to as the system root. In other words, the current or live data objects for a program 108 are all associated by references 202 to the system root 204 either directly or indirectly via one or more other objects 201. Any given object 201 may be referenced by any number of other objects 201. In other words, a given object 201 may be linked or associated with any number of other objects 201 by references from each of those other objects 201.

When a reference 202 to a given object 201 is no longer required by a program 108, the relevant reference 202 is removed from the object graph 203. In other words, the object 201 is de-referenced. However, since an object 201 may be referenced by any number of other objects 201, the removal of one reference does not necessarily indicate that the object has been discarded. Only once all references 202 to a given object have been removed can the object 201 be treated as discarded. Since all references 202 to a discarded object 201 will thus have been removed, the discarded object will no longer be linked or associated with the system root 204. The garbage collection process of the memory manager 106 is arranged to traverse the object graph for the memory 105 and identify all objects 201 that are linked either directly or indirectly to the system root 204. Such objects are referred to as live objects, that is, objects that are currently in use by the relevant program 108. All other objects 201 are treated as discarded or dead objects and can thus be removed from memory 105 and their allocated memory returned to the heap for reuse.

In an embodiment, the memory manager 106 is arranged to collect data for objects 201 in response to their dereferencing. During the garbage collection process, the memory manager 106 is further arranged, for any dereferenced object that is dead and to be discarded, to save a predetermined set of data relating to the dead object in the form of dead object data 110 shown in FIG. 1. In an embodiment, the dead object data includes an identification of the dead object, a reference to the live object from which the dead object was de-referenced, and field metadata identifying the field in the live object that contained the removed reference to the dead object.

Figure 2B:
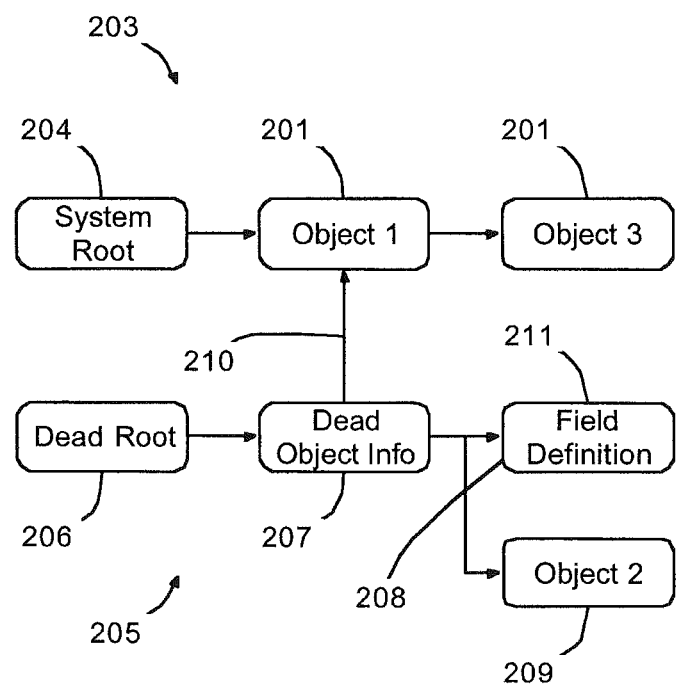

With reference to the embodiment shown in FIG. 2b, in order to collect the dead object data 110, the memory manager 106 is arranged to maintain a second object graph 205 for the memory 105 which includes the dereferenced objects. In an embodiment, the second object graph 205 includes a root object 206 referred to herein as the dead root. The memory manager 106 is arranged, in response to the dereferencing of an object from the first object graph 203, that is, the system root object graph, to add the dereferenced object to the dereferenced object graph 205. In an embodiment, this is implemented by adding a new object to the dereferenced object graph 205 in the form of a dead object information object 207. In an embodiment, all new dead object information objects are referenced directly from the dead root object 206. The dead object information object 207 includes a reference 208 to the newly dereferenced object 209. In an embodiment, the dead information object 207 further includes a reference 210 to the live object 201 from which the dereferenced object 209 was de-referenced. A field definition object 211 is also added to the dereferenced object graph 205 and referenced from the dead object information object 207. The field definition object 211 includes data identifying the field in the live object 201 that contained the removed reference to the newly dereferenced object 209.

The garbage collection process performed by the memory manager 106 is arranged, in a first phase commonly referred to as the marking phase, to search the system root object graph 203 and mark all connected objects present as "live". In other words, all objects that are referenced either directly from the system root 204 or indirectly from the system root 204 via one or more other objects 201 in the system root object graph 203 are identified as currently in use by a loaded program 108. The dereferenced object graph 205 not used for identifying "live" objects. Nevertheless, some of the objects identified via the system root object graph 203 may also be present in the dereferenced object graph 205. This occurs where a dereferenced object is referenced by more than one live object and one or more such references remain when the garbage collection process is performed.

In a second phase of the garbage collection process, the memory manager 106 is arranged to search the dereferenced object graph 205 to identify any connected object 209 that was not identified as "live" in the first phase and is thus a candidate for removal or sweeping form the memory 105. The garbage collection is arranged to exclude from this search any metadata objects, that is, in the present embodiment, the dead information objects 207 and the field definition objects 211. This avoids the unnecessary processing by the garbage collection process of metadata objects, which, in the present embodiment, are never referenced by a "live" object. For each such candidate object the associated objects in the form of the dead object information object 207 and the metadata object 211 that were created on dereferencing of the object are identified and the predetermined dead object data 110 extracted and stored as shown in the embodiment shown in FIG. 3. Thus, for each relevant object, the dead object data 110 firstly includes an object identifier 301 identifying the dead object 209. Secondly the dead object data 110 includes an identification 302 of the original parent 201 of the dead object 209 that is the object 201 that originally referenced the dead object 209. The identification 302 is derived from the reference 210 from the dead object information object 207 to the originally referencing object 201. Thirdly the dead object data 110 includes referencing field data 303 identifying the field in the object 201 that was used for originally referencing the dead object 209. The referencing field data 303 is extracted from the field definition object 211 referenced from the dead object information object 207.

Some objects may be present in the dereferenced object graph 205 that remain referenced from one or more live objects in the system root object graph 203 and thus remain "live". However, in the first phase of the garbage collection process the metadata objects associated with such dereferenced but still "live" objects will not get marked as "live" as they are inaccessible from the system root 204 and will thus be candidates for removal. Therefore, in order to preserve the metadata objects for such dereferenced but still "live" objects, the memory manager 106 is further arranged to identify any of the dereferenced objects in the second object graph 205 marked as "live" and to similarly mark their associated metadata objects as "live" to avoid their subsequent removal.

Once the dead object data 110 has been extracted from the relevant nodes of the dereferenced object graph 205 a third phase in the garbage collection process is initiated, commonly referred to as the sweeping phase. In this third phase, all objects in the memory 105 are scanned and all objects not marked as "live" are removed and their memory allocation returned to the heap for reuse. Where objects are removed from memory 105, the dereferenced object graph 205 is repaired to remove the now redundant metadata objects, that is, in an embodiment, the relevant dead information objects 207 and the field definition objects 211. Some objects may remain in the dereferenced object graph 205 as they are still referenced from one or more live objects in the system root object graph 203.

Figure 4:
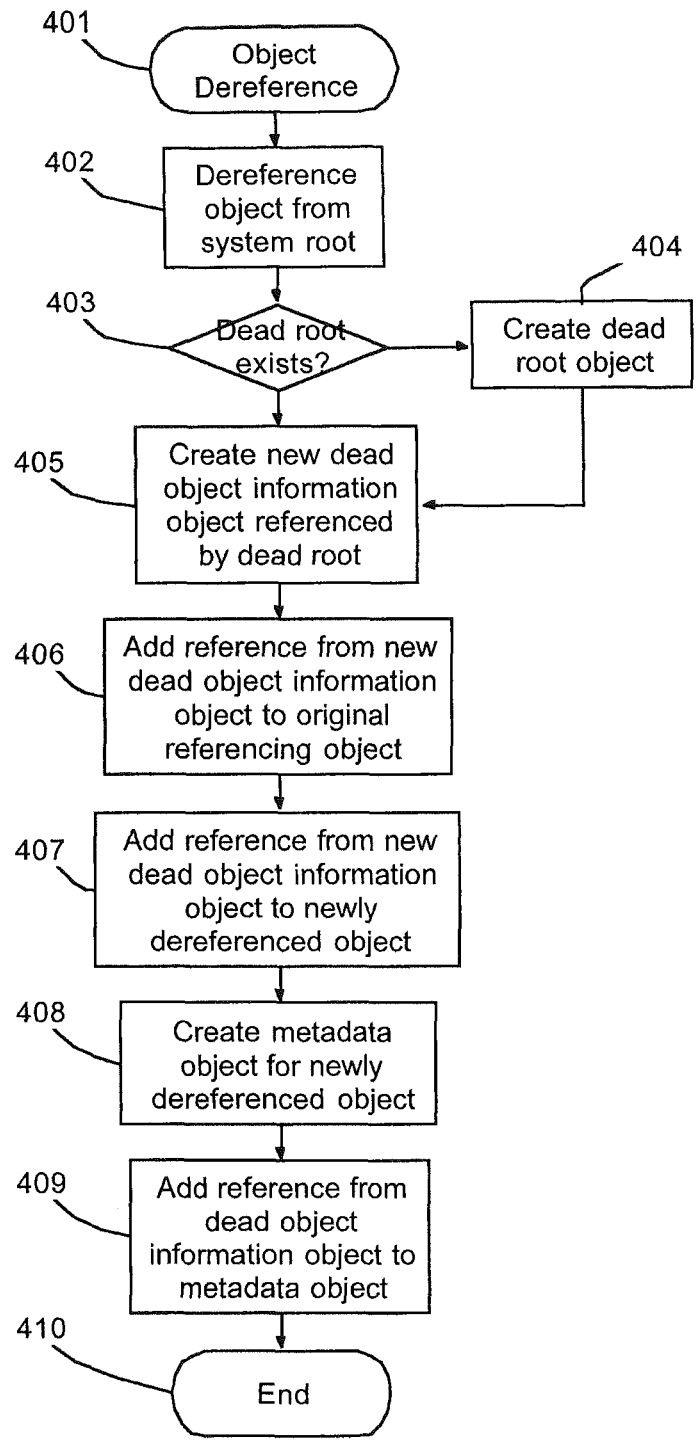
FIG. 4 is a flow chart illustrating processing performed in the computer system in response to the dereferencing of an object in the object graph of FIG. 2a in accordance with an embodiment.

An embodiment of the processing performed by the memory manager 106 in response to the dereferencing of an object will now be described with reference of the flow chart of FIG. 4. Processing is initiated at block 401 in response to the selection of an object for dereferencing and processing then moves to block 402. At block 402, the selected object is dereferenced from the system root object graph 203 and processing moves to block 403. At block 403, if no dead root object currently exists in the memory 105 then processing moves to block 404. At block 404, a dead root object 206 is created and processing moves to block 405. If, at block 403, a dead root object 206 is identified in the memory 105 then processing moves straight to block 405. At block 405, a new dead object information object 207 is created and a reference is added from the dead root object 206 to the new dead object information object 207 and processing moves to block 406. At block 406, a reference is added from the new dead object information object 207 to the live object 201 that referenced the newly dereferenced object 209 immediately prior to its dereferencing and processing moves to block 407. At block 407, a reference is added from the new dead object information object 207 to the newly dereferenced object 209 and processing moves to block 408. At block 408, a new metadata object 211 is created and data identifying the field in the prior referencing object 201 that provided the reference to the newly dereferenced object 209 and processing moves to block 409. At block 409, a reference to the new metadata object 211 is added to the dead object information object 207. Processing then moves to block 410 and ends.

Figure 5:
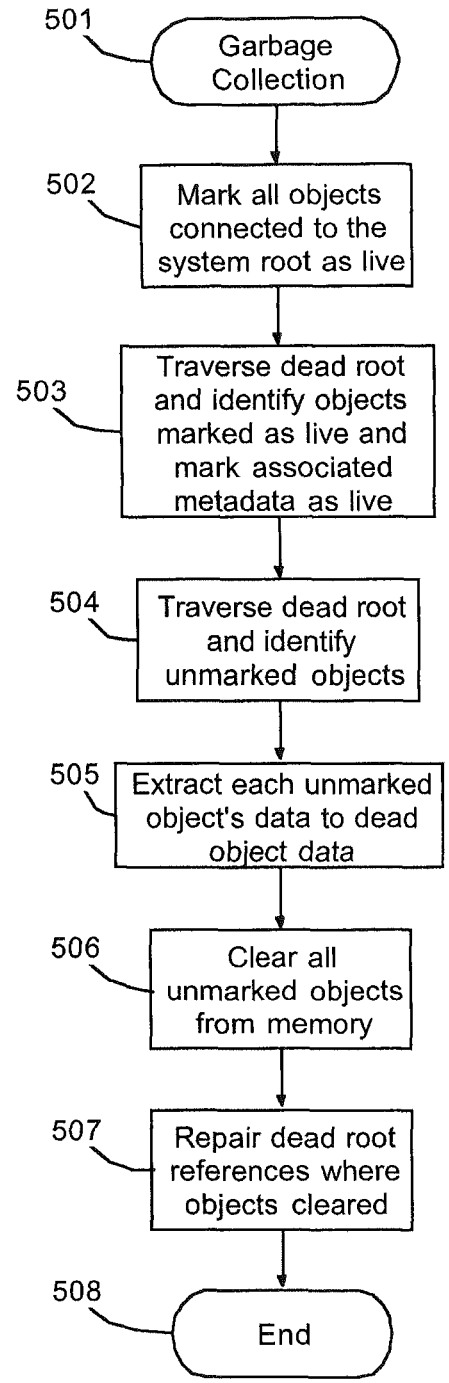
FIG. 5 is a flow chart illustrating processing performed in response to a garbage collection process performed on the object graph of FIG. 2b resulting in the data of FIG. 3 in accordance with an embodiment.

An embodiment of the processing performed by the memory manager 106 in the garbage collection process will now be described with reference of the flow chart of FIG. 5. Processing is initiated at block 501 in accordance with the garbage collection scheduling of the memory manager 106 and processing then moves to block 502. At block 502, the system root object graph 203 is traversed and all accessible objects marked as live and processing moves to block 503. At block 503, the dereferenced object graph 205 is traversed to identify any dereferenced objects marked as "live", identify their associated metadata objects and mark those objects as "live" and processing moves to block 504. At block 504, the dereferenced object graph 205 is traversed to identify any connected object 209 that was not identified as "live" in block 502 and is thus a candidate object for removal from memory 105 and processing moves to block 505. At block 505, for each identified candidate for removal, the dead object data 110 is extracted from the relevant objects in the dereferenced object graph 205 and stored and processing moves to block 506. At block 506, all candidate objects for removal identified in block 502 are removed from memory and their memory allocations returned to the heap and processing moves to block 507. At block 507, the dereferenced object graph 205 is repaired where necessary to take into account the removed objects. Processing then moves to block 508 and ends.

In another embodiment, the dead object data includes an identification of closest live object that references a given dead object either directly or indirectly via one or more other dead objects.

In a further embodiment, the memory manager provides memory allocations from two heaps. The first heap provides storage for all objects and the second heap provides storage for the dead root object and the metadata objects such as the dead information objects and the field definition objects. In response to the dereferencing of an object in the first heap, a corresponding set of metadata objects is created in the second heap including a cross-heap reference to the dereferenced object in the first heap. When the garbage collection process is applied to the first heap any dereferenced object with no further references from live objects will be identified as a candidate for removal. The cross-heap reference from the metadata objects in the second heap will not be visible and thus not disrupt the identification of the dereferenced object by the garbage collection process. For each object identified as a candidate for removal, the second heap is scanned to identify and output the associated object metadata. The cross-heap reference from the metadata to the associated object in the first heap is then removed. A second garbage collection process is then performed on the second heap starting from the dead root and arranged to identify and remove any metadata objects not connected to a live object, that is, without a cross-heap reference to a live object.

As will be understood by those skilled in the art embodiments of the invention are not limited to Java or the JRE and may be applied to any virtual machine system or environment. Suitable virtual machine systems or environments may be arranged to run directly on a computer system or run on an operating system. In other words, the virtual machine system or environment may run natively or be hosted. The virtual machines may be provided by software emulation or hardware virtualization.

As will be understood by those skilled in the art, embodiments of the invention may be applied to the physical machine environment, that is, to operating systems running directly on a physical computer and providing a platform for running one or more application programs.

As will be understood by those skilled in the art any suitable level of dead object data may be provided for a given application. In some applications, minimal dead object data may be provided which provides a single data item for each dead object such as an identifier for the dead object or an identification of the object that referenced the dead object immediately prior to its dereferencing or an identification of closest live object that references a given dead object either directly or indirectly via one or more other dead objects.

Embodiments of the invention reference the metadata objects associated with dereferenced objects from the dead root and the dereferenced object itself is referenced from the metadata. This avoids the need for additional fields in objects for referencing their respective metadata. Such additional fields may need to be hidden in some implementations.

Embodiments of the invention are arranged to preserve data relating to the memory objects that have been created during the processing of programs on a computer that have subsequently been removed from memory as a result of a garbage collection process or other suitable memory management process. The data may include an identification of the removed objects or detail of the objects that were associated with the removed object or referenced the removed object. The data may include identification of the fields of referencing objects from which the removed object was referenced. The dead object data can be used for identifying the programs, parts of programs or other processes that created the respective objects. Such identification is useful for monitoring, measuring, modifying or improving the memory usage of the relevant program, program part or other process. The data may be used for reconstructing the system object graph at selected points in the associated processing.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

What is claimed is:

1. A method for managing memory in a computer system in which memory locations in use at any given time are represented as a set of memory objects in a system root object graph comprising:
   identifying one or more candidate objects in a dereferenced object graph, the dereferenced object graph including a set of objects that were dereferenced from the system root object graph, the one or more candidate objects being connected objects in the dereferenced object graph that are not marked as being live, wherein the dereferenced object graph is stored in a memory;
   extracting dead object data from the one or more candidate objects;
   removing, after extracting the dead object data from the one or more candidate objects, the one or more candidate objects from memory;
   storing the extracted dead object data in the dereferenced object graph; and
   repairing the dereferenced object graph.

2. The method of claim 1, the method further comprising:
   traversing the system root object graph, the system root object graph being associated with a program; and
   marking one or more connected objects in the system root object graph as live, the one or more connected objects being objects that are connected to a system root object, wherein an object is considered live if it is in use by the program.

3. The method of claim 2, wherein the identifying one or more candidate objects in the dereferenced object graph comprises:
   traversing the dereferenced object graph to identify one or more dereferenced objects in the dereferenced object graph that are marked as live, wherein the one or more candidate objects include objects in the dereferenced object graph that are not marked as live.

4. The method of claim 3, the method further comprising:
   identifying metadata objects associated with the one or more live dereferenced objects;
   marking the metadata objects as live; and
   returning, after removing the one or more candidate objects from memory, memory allocations of the one or more candidate objects to a heap.

5. The method of claim 4, wherein the candidate objects do not include metadata objects, and wherein the metadata objects include dead information objects and field definition objects.

6. The method of claim 2, wherein the one or more connected objects represent memory locations in use at any given time, and wherein the system root object is associated by references to each of the connected objects, the method further comprising:
  creating a dead root object so as to form the dereferenced object graph; and
  in response to a dereferencing of a first object from the system root object graph, associating the dereferenced first object with the dereferenced object graph so that the dereferenced object graph comprises one or more dereferenced objects.

7. The method of claim 1, wherein the dead object data for an candidate object includes an object identifier that identifies the candidate object, an identification of a parent object of the candidate object, and referencing field data that identifies a field in the parent object that referenced the candidate object.

8. The method of claim 7, wherein the parent object of the candidate object is an object in the system root object graph that indirectly references the candidate object via one or more dead objects.

9. The method of claim 1, wherein the repairing the dereferenced object graph includes removing redundant metadata objects from the dereferenced object graph.

10. The method of claim 1, the method further comprising:
  providing, by a memory manager, memory allocations from a first heap and a second heap, the first heap including storage for connected objects, the second heap including storage for a dead root object and metadata objects;
  creating, in response to dereferencing an object in the first heap, a corresponding set of metadata objects in the second heap, the corresponding set of metadata objects including a cross-heap reference to the dereferenced object in the first heap.

11. The method of claim 1, wherein storing the extracted dead object data in the dereferenced object graph includes replacing the one or more candidate objects in the dereferenced object graph with associated dead object data.

12. The method of claim 11, the method further comprising:
  identifying, using the dead object data, one or more processes that created the dereferenced objects, the one or more processes being part of the application;
  reconstructing the system root object graph using the dead object data at a selected point in the associated processing of the application; and
  modifying the application to improve memory usage of the processes.

13. A system for managing memory in a computer system, the system comprising:
  a memory, wherein memory locations in the memory that are in use at any given time are represented as a set of memory objects in a system root object graph, the system root object graph including a system root object associated by references to each of the memory objects; and
  a processor configured to perform a method comprising:
    identifying one or more candidate objects in a dereferenced object graph, the dereferenced object graph including a set of objects that were dereferenced from the system root object graph, the one or more candidate objects being connected objects in the dereferenced object graph that are not marked as being live, wherein the dereferenced object graph is stored in the memory;
    extracting dead object data from the one or more candidate objects;
    removing, after extracting the dead object data from the one or more candidate objects, the one or more candidate objects from memory;
    storing the extracted dead object data in the dereferenced object graph; and;
    repairing the dereferenced object graph.

14. The system of claim 13, wherein the method performed by the processor further comprises:
  traversing the system root object graph; and
  marking one or more memory objects in the system root object graph as live, the one or more connected objects being objects that are connected to a system root object, wherein an object is considered live if it is in use by a program.

15. The system of claim 14, wherein the identifying one or more candidate objects in the dereferenced object graph comprises:
  traversing the dereferenced object graph to identify one or more dereferenced objects in the dereferenced object graph that are marked as live, wherein the one or more candidate objects include objects in the dereferenced object graph that are not marked as live.

16. The method of claim 15, wherein the method performed by the processor further comprises:
  identifying metadata objects associated with the one or more live dereferenced objects;
  marking the metadata objects as live; and
  returning, after removing the one or more candidate objects from memory, memory allocations of the one or more candidate objects to a heap.

17. The system of claim 14, wherein the method performed by the processor further comprises:
  creating a dead root object so as to form the dereferenced object graph; and
  in response to a dereferencing of a first object from the system root object graph, associating the dereferenced first object with the dereferenced object graph so that the dereferenced object graph comprises one or more dereferenced objects.

18. A computer program product comprising a computer readable storage medium having program code embodied therewith, wherein the computer readable storage medium is not a transitory signal per se, the program code executable by a processor to cause the processor to perform a method comprising:
  traversing a system root object graph associated with a program, wherein memory locations in use at any given time are represented as a set of memory objects in the system root object graph;
  marking one or more connected objects in the system root object graph as live, the one or more connected object being objects that are connected to a system root object, wherein an object is considered live if it is in use by the program;
  identifying one or more candidate objects in a dereferenced object graph, the dereferenced object graph including a set of objects that were dereferenced from the system root object graph, the one or more candidate objects being connected objects in the dereferenced object graph that are not marked as being live, wherein the dereferenced object graph is stored in a memory;
  extracting dead object data from the one or more candidate objects;
  removing, after extracting the dead object data from the one or more candidate objects, the one or more candidate objects from memory storing the extracted dead object data in the dereferenced object graph; and repairing the dereferenced object graph.

19. The computer program product of claim 18, wherein the one or more connected objects represent memory locations in use at any given time, wherein the system root object is associated by references to each of the connected objects, and wherein the method performed by the processor further comprises:

creating a dead root object so as to form the dereferenced object graph; and in response to a dereferencing of a first object from the system root object graph, associating the dereferenced first object with the dereferenced object graph so that the dereferenced object graph comprises one or more dereferenced objects.

20. The computer program product of claim 18, wherein the repairing the dereferenced object graph includes removing redundant metadata objects from the dereferenced object graph, wherein the method performed by the processor further comprises:

providing, by a memory manager, memory allocations from a first heap and a second heap, the first heap including storage for connected objects, the second heap including storage for a dead root object and metadata objects;

creating, in response to dereferencing an object in the first heap, a corresponding set of metadata objects in the second heap, the corresponding set of metadata objects including a cross-heap reference to the dereferenced object in the first heap.

* * * * *